Feb. 13, 1968   R. J. SEYLER   3,368,492
EXTERNAL ARMATURE BIAS AND SEALING MEANS FOR MOTOR PUMP UNIT
Filed Jan. 20, 1966

INVENTOR
Robert J. Seyler

BY *Clive H. Bramson*

ATTORNEY

United States Patent Office 3,368,492
Patented Feb. 13, 1968

3,368,492
EXTERNAL ARMATURE BIAS AND SEALING
MEANS FOR MOTOR PUMP UNIT
Robert J. Seyler, 8 Pansmith Lane,
West Islip, N.Y. 11795
Filed Jan. 20, 1966, Ser. No. 521,903
4 Claims. (Cl. 103—87)

ABSTRACT OF THE DISCLOSURE

A motor pump unit having an electric motor and a fluid impeller, the armature shaft of the motor acting as the prime mover of the impeller. A sealing ring disposed integrally and annularly of the armature shaft provides a seal between the impeller casing and the motor housing by rotatively abutting the deepest wall of a recessed portion provided annularly within the wall of the casing. An end of a bushing sleeve which is flush with said deepest wall is also rotatively abutted by said sealing ring, said recessed portion and said bushing sleeve in combination providing a seat for said sealing ring. A coil spring acts to bias said armature whereby said sealing ring is urged into seating engagement with said recessed portion and said sleeve bushing, said coil spring being disposed annularly of said armature shaft and outside of the motor housing at the end of the latter which is remote with respect to said impeller casing.

---

This invention relates generally to motor driven pump units and more particularly to an electrically driven motor pump unit wherein the fluid seal between the fluid impeller and the motor housing is effectuated by bias means disposed remotely with respect to said fluid seal and therefore externally of the circulating fluid.

Specifically, the present invention concerns the provisions of continual tension applied to the armature shaft whereby a fluid seal will be maintained between the region ambient the impeller and the region internally of the electric motor, said tension being applied to said shaft from a point removed from said ambient region.

As is well known, motor driven impeller units depend upon sealing means interposed between the fluid circulating impeller and the driving means to preclude penetration of the fluid into said driving means. Such preclusion of fluid penetration is especially vital in pump units utilizing an electric motor as the driving means. Whereas the impeller is usually connected to the motor drive shaft or armature shaft in the case of an electrically driven unit, a rotatively abutting seal between the impeller and the motor housing is employed.

In heretofore known sealing systems, the fluid seal is usually accomplished between the annular edge of a sleeve member and a seat member, the former being disposed annularly of the shaft between the impeller and the motor housing, and the latter being connected to the shaft between the impeller and said sleeve member. A coil spring or other suitable bias means acts directly upon said sleeve member to continually urge said member against the seat member as the latter rotates with the shaft and the impeller. Thus leakage from the fluid circulating area or region ambient with respect to the impeller into the motor housing is precluded. However, inasmuch as the spring is directly within the fluid, e.g., water, during the operation of the pump, the spring is caused to vibrate setting up a noise factor analogous to that of a tuning fork, such noise being, of course, undesirable. Secondly, the spring is not readily accessible where replacement or repair thereof becomes necessary. That is, removal of the impeller is essential for replacement of the spring. The relative complexity of such a system and the relatively large number of parts required therefor, are further disadvantages encountered in the aforesaid prior art sealing system.

Accordingly, and consonant with the foregoing, the instant invention has for an object the provision of an electric motor pump unit wherein the armature shaft is subjected to axial tension whereby the sealing means will be maintained in rotatively abutting relation and whereby the tension-causing means is remotely disposed with respect to the region ambient the impeller.

Another object of the present invention is to provide a device of the foregoing character which will render the bias means readily accessible without requiring disassembly of the device.

A further object of this invention resides in the provision of a motor pump unit wherein the fluid seal bias means will not vibrate thereby eliminating any undesirable noise factor.

Another object of the present invention is to provide a device in accordance with the foregoing which includes a greatly simplified fluid sealing system.

Still another object of the instant invention is to provide a motor pump unit consisting of fewer parts in the fluid seal area and therefore economical to manufacture and maintain and highly effective in use.

Other objects and advantages of the instant electric motor pump unit will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

FIGURE 5 is a front view of the retaining clip used to secure the bias means to the armature shaft; and FIGURE 6 is a front view of the thrust washer against which one end of the coil spring shown in FIGURES 1 and 2 bears.

Figure 1:
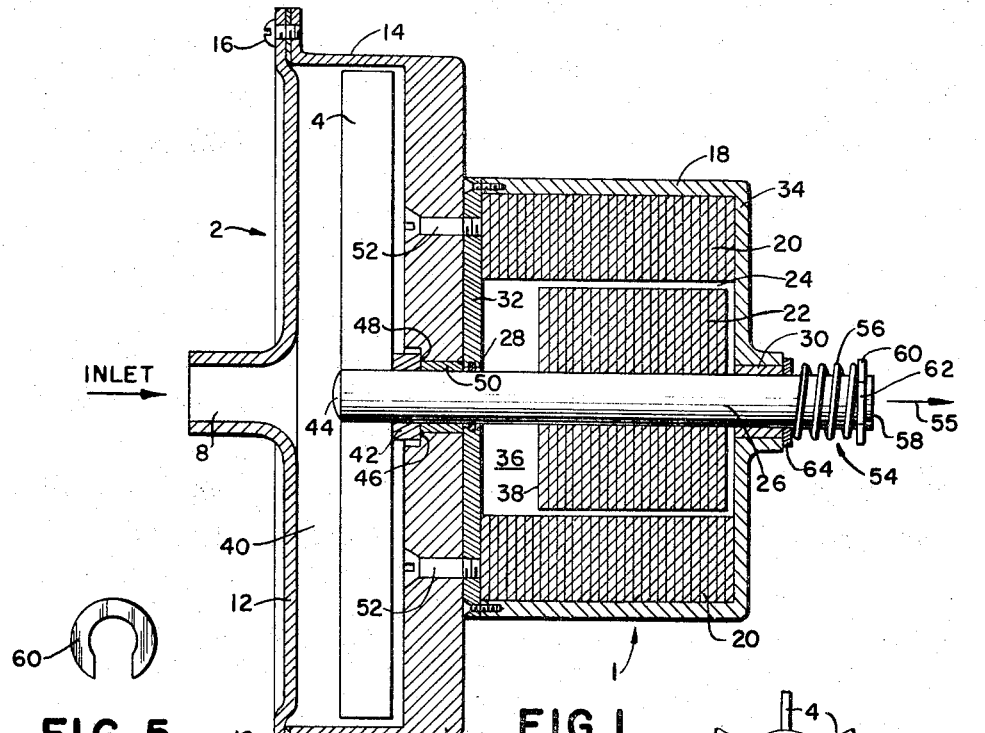
FIGURE 1 is a cross-sectional elevation of the assembled motor pump unit wherein the armature shaft is illustrated under tension whereby the sealing means is maintained in abutting relation.
Figure 4:
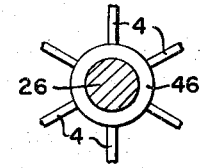
FIGURE 4 is a view taken along line 4—4 of FIGURE 2.
Figure 3:
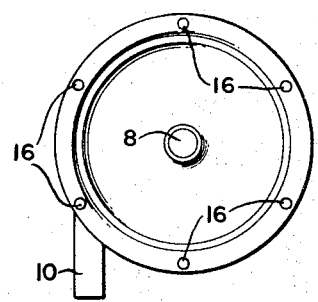
FIGURE 3 is a reduced front end view of the present device.

Referring now in detail to the present preferred embodiment of the invention illustrated in the accompanying drawings, FIGURE 1 shows the completely assembled motor pump unit, said unit being essentially comprised of a conventional electric motor indicated generally by numeral 1 and fluid impeller means designated generally as numeral 2. As shown, impeller 4 is rotatively disposed within casing 6, the latter having a fluid inlet duct 8 and a fluid outlet duct 10, said outlet duct being arranged substantially tangentially with respect to said casing 6, as illustrated in FIGURE 3 of the drawings. The inlet duct is provided centrally of front plate 12, the latter being secured to the side walls 14 of said casing by the circle of bolts 16 arranged peripherally of said front plate.

The electric motor 1, as shown, is comprised of housing 18, the conventional stator member 20 and rotor or armature member 22 and the usual air gap 24 between the rotor and stator shaft 26 of said armature member, as will be observed, is journalled within passages 28 and 30, the latter being provided within forward and rearward walls 32 and 34, respectively, of said motor housing, and being arranged in axial alignment whereby said shaft is slidable and rotatively mounted therethrough. Space 36 between forward wall 32 and end 38 of the armature allows for such slidable movement as will be described in detail hereinbelow.

It will be understood that the construction of the motor and the impeller means shown herein is for purposes of illustration only, it being contemplated that other suitable such elements may be employed.

To the end of precluding fluid leakage from region 40 ambient said impeller 4 to within said motor housing 18, sealing means is provided intermediate said impeller and forward wall 32 of said housing. More specifically, sealing ring 42 is disposed annularly and integrally of shaft 26, inwardly of forward end 44 thereof and on the side of the impeller which is opposite the forward wall of said housing. Accordingly, said sealing ring is adapted for rotation with the shaft and impeller whereby the sealing edge 46 of said ring will rotate while facing stationary edge 48 of bushing sleeve 50, and deepest wall 51 of recessed annular portion 53, the latter being integral with the wall of said casing 6 which is secured by bolts 52 to wall 32 of said housing, said bushing sleeve being concentric with respect to passage 28 within wall 32. As shown, said sealing ring 42 is greater in thickness than the depth of said recessed annular portion. As stated previously, shaft 26 is slidable within said passages 28 and 30 and more particularly between the positions respectively shown in FIGURES 1 and 2, i.e., as shown, a distance at least equal to twice the depth of said recessed annular portion.

With reference now to FIGURE 1, it will be seen that bias means designated generally by numeral 54 functions to continually urge said shaft in the direction of arrow 55, i.e., away from the forward wall 32, and toward the rearward wall 34 of said housing, to thereby maintain edges 46 and 48 of said sealing means in rotatively abutting relation to thereby preclude fluid flow through passage 28 and thus effectuate the fluid seal between the region 40 ambient said impeller 4 and the region internally of said housing. Coil spring 56, it will be seen, is disposed annularly and inwardly of rear end 58 of shaft 26 and is secured thereat between retaining clip 60, which is retained within groove 62 adjacent said rear end 58, and thrust washer 64, the latter being positioned intermediate said coil spring and passage 30 provided through said rearward wall 34.

Figure 2:
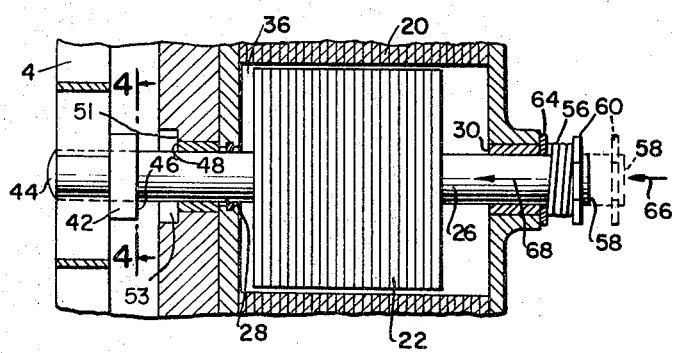
FIGURE 2 is a fragmentary cros-sectional view of the motor pump unit wherein the sealing means is shown in non-abutting relation by reason of an externally applied force resulting in a shift of the armature.

Referring now to FIGURE 2 of the drawings, it will be understood that an external force 66 applied against end 58 of said shaft, which will overcome the tension due to spring 56, will occasion movement of said shaft 26 in the direction of arrow 68 to thereby unseat edges 46 and 48 and thus momentarily destroy the aforedescribed fluid seal. Upon removal of said force 66, however, the seal will be restored by dint of said bias means 54 inasmuch as said edges 46 and 48 will resume their rotatively abutting relation. Therefore, it will be appreciated, the external bias means is readily accessible, free of the ambient fluid, e.g., water, and highly effective in continually maintaining the sealing means operative, the foregoing being the primary desiderata of the present invention.

Although the preferred embodiment of the external armature biasing structure has been described, it will be understood that within the purview of this invention various changes may be made in the forms, details, proportion and arrangement of parts, the combination thereof and mode of operation, which generally stated consists in a device capable of carrying out the objects set forth as disclosed and defined in the appended claims.

What is claimed is:

1. A motor pump unit comprising, in combination, an electric motor, impeller means, sealing means and bias means, said sealing and bias means being cooperatively associated for maintaining a fluid seal between said motor and impeller means; said electric motor being comprised of a housing including forward and rearward walls, each of said walls having a passage therethrough, said passages being in relative axial alignment; a casing within which said impeller means is rotatively disposed, said casing having inlet and outlet ducts and a passage through a wall thereof, said latter passage including a recessed annular portion and a bushing sleeve, one edge of the latter being flush with the deepest wall of said annular portion, said annular portion being of relatively greater diameter than said bushing sleeve and said bushing sleeve extending from said casing wall to said forward wall of said housing; an armature member, the latter including a shaft having forward and rearward ends, said ends being journalled for rotation through said passages within said forward and rearward housing walls; a sealing ring provided annularly and integrally of the forward end of said shaft; said sealing means being disposed intermediate said impeller means and said forward wall and being coactingly comprised of said recessed annular portion, said one edge of said bushing sleeve, and said sealing ring, the latter being removably received within said recessed annular portion; said impeller means being connected to said shaft opposite the forward wall and externally of said housing; said bias means being positioned remotely of said sealing means and out of contact with the fluid ambient with respect to said impeller means, said bias means being adapted to continually urge said shaft in a direction away from said forward wall and toward said rearward wall to maintain said sealing ring in rotatively abutting relation against said one edge of said bushing sleeve and said deepest wall of said annular portion to thereby preclude fluid flow through said passage in said forward wall and thus effectuate the fluid seal between the region ambient said impeller means and the region internally of said housing.

2. A motor pump unit as set forth in claim 1 wherein said bias means is disposed between the rearward wall of said housing and the rearward end of said shaft.

3. A motor pump unit as set forth in claim 1 wherein said bias means is comprised of a coil spring disposed annularly of said shaft and secured thereto between a retaining clip and a thrust washer, the latter being positioned intermediate said coil spring and the passage through said rearward wall, said coil spring being compressible a distance greater than the depth of said recessed annular portion whereby said sealing ring can be entirely withdrawn from said recessed annular portion while said armature member is retained within said housing.

4. A motor pump unit as set forth in claim 1 wherein said armature shaft is axially slidable with respect to a stator member disposed annularly thereof, the slidable distance of said armature shaft being at least equal to twice the depth of said recessed annular portion, said armature and forward wall of the housing being normally spaced to permit movement of said armature shaft over said slidable distance.

References Cited
UNITED STATES PATENTS

| | | | |
|---|---|---|---|
| 897,397 | 9/1908 | Pirkl | 103—103 |
| 2,353,871 | 7/1944 | Bowen | 103—103 |
| 2,599,307 | 6/1952 | Woodson | 103—87 X |
| 2,824,520 | 2/1958 | Bartels | 103—87 |

ROBERT M. WALKER, *Primary Examiner.*